UNITED STATES PATENT OFFICE.

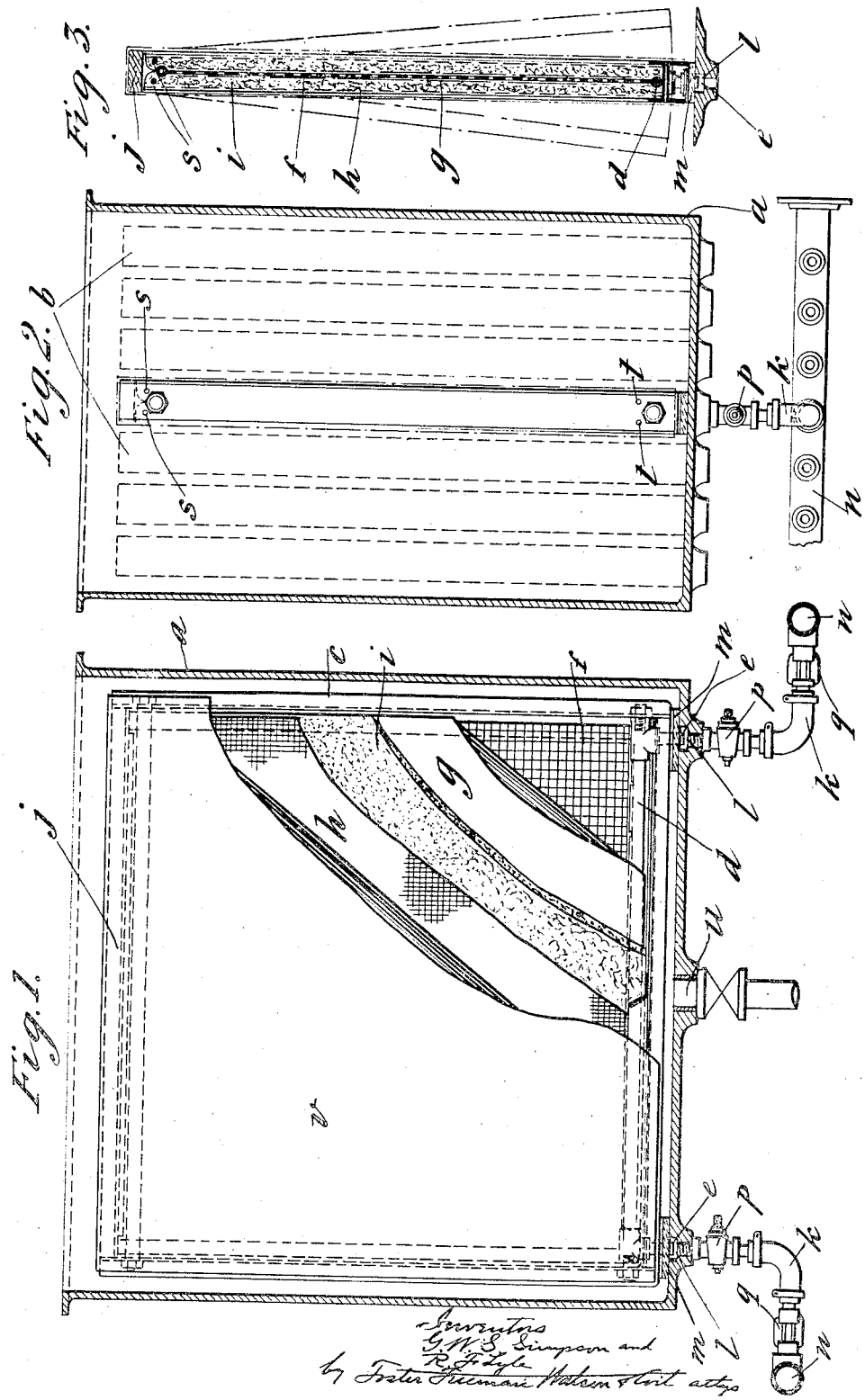

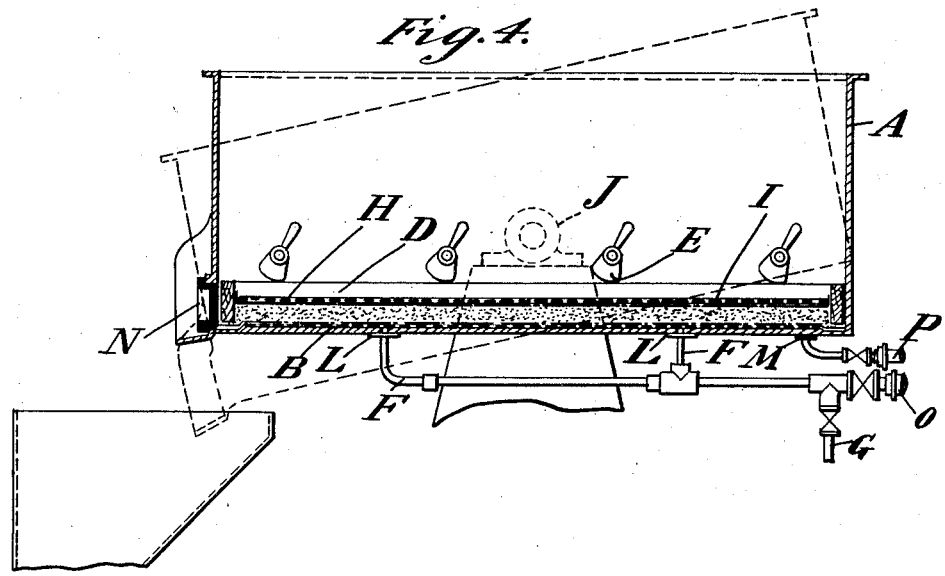
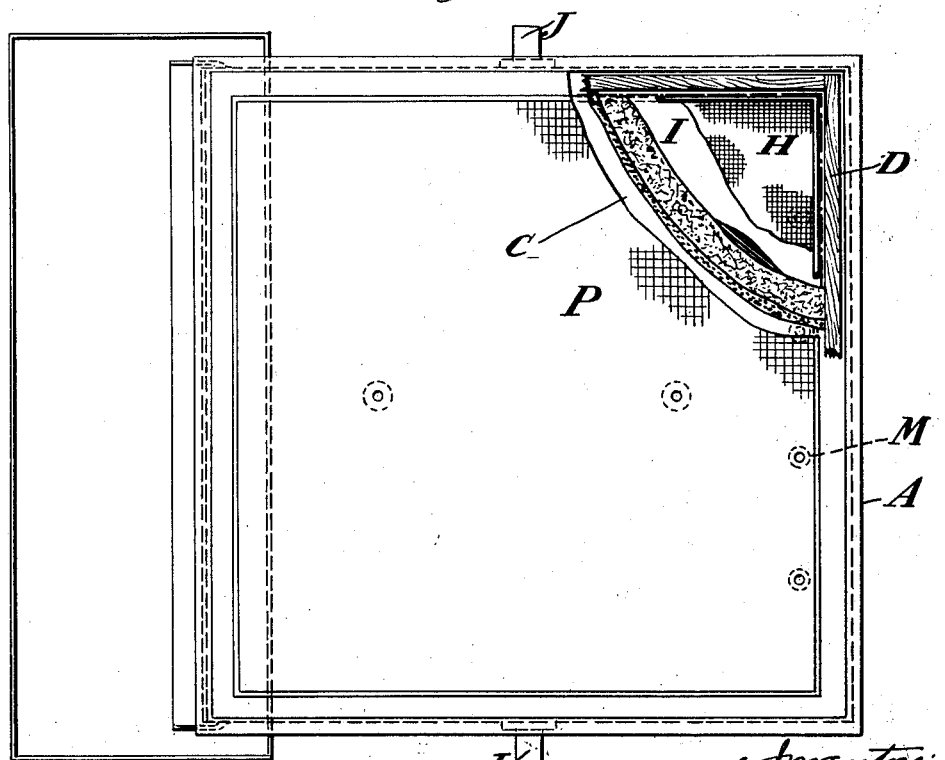

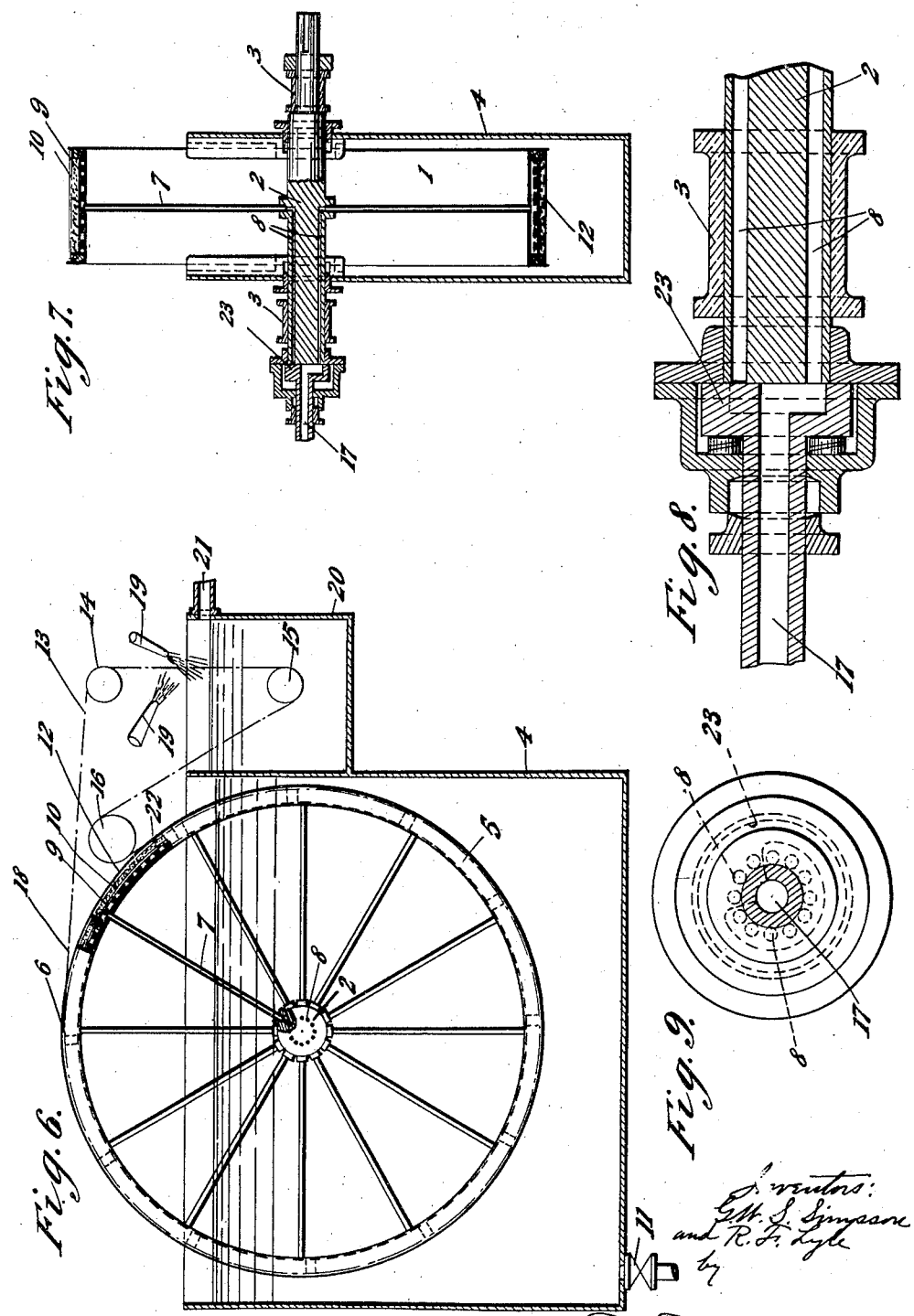

GEORGE WILLIAM SYDNEY SIMPSON, OF LONDON, ENGLAND, AND ROBERT F. LYLE, OF GREENOCK, SCOTLAND.

FILTRATION OF SUGAR LIQUORS.

1,401,199.      Specification of Letters Patent.    Patented Dec. 27, 1921.

Application filed June 24, 1918. Serial No. 241,587.

*To all whom it may concern:*

Be it known that we, GEORGE WILLIAM SYDNEY SIMPSON and ROBERT FERRIS LYLE, both subjects of the King of Great Britain, residing, respectively, in London, England, and Greenock, Scotland, have jointly invented a certain new and useful Improvement in the Filtration of Sugar Liquors, of which the following is a specification.

In the usual methods of refining sugar it is necessary to remove the suspended or insoluble bodies contained in the liquor prior to the decolorization of such liquor by charcoal, and this end is ordinarily accomplished by filtration through what are known as Taylor bags, or through various well known types of filter presses, the usual filtering surface being of woven material, and more rarely filtration has been tried through gravel, peat, various vegetable fibers, or other well known filtering media.

The present invention is the result of a series of laboratory experiments by which it has been found that the mosses known as sphagnum and leucobryum constitute a most satisfactory filtering medium for the sugar liquors. Owing to their structure these mosses have a high capacity for absorbing moisture and it is probably this capacity which causes them to separate the suspended matter from the sugar liquor without becoming rapidly clogged.

To apply the invention, the selected moss, say sphagnum, is dried, disintegrated and cleaned. The cleaning is effected by boiling the disintegrated moss in a solution of caustic soda, sodium carbonate or other like alkali, for instance a caustic soda lye containing 3 per cent. of its weight of caustic soda, for say 60 minutes, and then by washing the moss with water until free from alkali. The moss is then suitably packed between retaining and necessarily permeable walls so as to form a filter through which the sugar liquor is forced or drawn. Various forms of retaining walls may be used, thus where ground space is no object an ordinary tank with a bottom of suitable gauze or perforations may be packed with sphagnum upon which a further gauze or permeable covering is placed to hold the moss in position and the sugar liquor may be forced or drawn therethrough, or the known rotary form of filter similarly provided with retaining walls containing the sphagnum may be used, but probably the preferable form will be that of the leaf filter.

In the accompanying drawings Figure 1 is a vertical cross section through a leaf filter tank, showing one of the leaves in elevation; Fig. 2 is a part longitudinal section through the tank, showing one of the leaves in end elevation; Fig. 3 is a cross section through one of the leaves.

Fig. 4 is a vertical section and Fig. 5 a plan of a filter tank containing a horizontal filter bed.

Figs. 6 and 7 are vertical sections, in planes at right angles to each other, through a rotary filter, Figs. 8 and 9 being detail views drawn to an enlarged scale.

Referring to Figs. 1–3, in a suitable tank $a$ is placed a series of leaves or cells $b$, $b$. Each cell is composed of a rectangular metal frame $c$ having at its bottom part a perforated pipe $d$ closed at its ends but having outlets through the nipples $e$, $e$. Fixed in the middle longitudinal plane of the frame, and substantially co-extensive with this plane, is a coarse mesh wire screen $f$, and completely covering both sides of this screen and extending around the pipe $d$ is a coarse texture cloth, or a fine mesh wire screen $g$. The screen thus covered constitutes a partition within the frame $c$. On each side of this partition the opening in the frame is filled by a movable perforated metal screen $h$, so that there is a chamber on each side of the partition, closed at the ends and bottom but open at the top. Into these vertical chambers or cells the moss mixed with water is run. The surplus water drains through the metal screen and is led away leaving a cake of moist moss $i$ between the central partition and each metal screen $h$.

A suitable cover $j$ is then placed over the top of the cells to keep the moss in position, preventing it floating out of the cells when sugar liquor is poured into the tank.

The leaves or cells are placed in the tank $a$ with sufficient clearance between them for the sugar liquor to circulate freely around them, and so that the nipples $e$, $e$ enter the corresponding recesses $l$ $l$ in the bottom of the tank. Washers $m$, $m$ around the nipples make tight joints between the leaves and the tank. The leaves are clamped down at the top by a suitable device to prevent them from floating when the tank is full of liquor. Each leaf is separately connected with the main vacuum pipes $n$, $n$ by flexible pipes $k$, $k$, cocks $p$, $p$ being provided to shut off the connection between the tank and the vacuum pipes, so that any leaf can be cut out or removed from the tank at any time without interfering with the operation of the filter as a whole. Sight glasses $q$, $q$ allow observation of the clarity of the filtrate from each leaf during the operation of filtration.

The movable metal screens $h$, $h$ are hinged at the points $s$, $s$ so that when the fastenings indicated at $t$, $t$ are undone the screens can be swung outward and upward to allow the exhausted moss to be freely discharged from them.

At the bottom of the tank $a$ is an outlet $u$ through which excess liquor or water can be discharged.

Some sugar liquors are so dirty that the surface of the moss becomes coated with a thin film of gummy substance and coarse impurities, through which the sugar liquor is unable to pass, though the whole of the moss cake is not permeated and choked by these impurities; in such cases the whole of the filtering surface of the leaf may, if desired, be covered with an outer cloth $v$ of open texture, through which the liquor and finer impurities will easily pass, but which catches the gummy and coarse substances, thus straining the liquor before it enters the moss and rendering less frequent the renewal of the latter. This cloth is attached to the filter leaf or frame by clips or other convenient device which will enable it to be easily and quickly removed and replaced without disturbing the moss cake.

When the filter is ready for use the unfiltered sugar liquor, previously heated, defecated if necessary and gravity-adjusted in any well known type of blow-up or tank, is allowed to flow into the tank containing the battery of filter leaves.

The pump having been started the impure liquor is gently drawn through the cake of moss (which acts as the filtering medium) through the coarse mesh cloth (which serves only as a screen to prevent the moss from filling up the suction pipes) through the perforations in the pipe $d$ and outlet $e$ into the multiple header $n$ and thence through the vacuum pump, or vacuum receiving drums into the receiving tanks.

The issuing liquor being clarified from suspended matter is ready for decolorization by filtration through charcoal in the ordinary process of refining.

As the impurities from the sugar liquor gradually collect on and in the moss, the rate of filtration would decrease and the vacuum would therefore be correspondingly and gradually raised to counteract this and maintain an even flow of liquor, but when the limits of increasing vacuum have been reached, the vacuum pump should be stopped and the tank emptied of its unfiltered liquor, and refilled with hot water, which should be allowed to permeate the clogged moss for a few minutes, whereafter suction is again applied and a moderate amount of hot water is drawn through the cake. This is a regenerative process which opens up the moss so that sugar liquor can be again filtered without removing the moss from the filter cells. This process may be repeated several times before the moss becomes so clogged with impurities that the rate of filtration of the sugar liquor would be too slow to be economically practicable.

Or, as an alternative to this procedure, if the outer cloths $v$ are used, when the rate of filtration has become too slow, the leaves are raised one by one; the cocks $p$, $p$ corresponding with each being first closed; the dirty cloth is removed and a clean one put on and the leaf again lowered into position. The dirty cloths are cleaned in an ordinary laundry washer. In this case the vacuum pump is not stopped, nor is the unfiltered liquor removed from the tank. The changing of the cloths may be repeated until the filtering capacity of the moss has become exhausted.

When this stage arrives the excess sugar liquor would be returned to the blow-ups or delivery tanks. Hot water would then be added to the tank and allowed to soak into the moss for some time before the suction pump is restarted; but when this is done the water would be slowly drawn through the moss; the remaining sugar liquor, reduced in gravity, would thus be removed from the moss, and being still clear and bright could be used in the process of dissolving the raw sugar.

To remove the dirty moss from the filter leaves and substitute clean, the leaves are raised from the tank, the covers $j$ removed, and the screens $h$, $h$ opened (as indicated in Fig. 3) whereupon the moss falls from them into the tank or other convenient receptacle, from which it can be discharged by sluicing it with water, or by mechanical methods, to a washing tank. When the cake is disintegrated by water it will be found that the adhering dirty matter floats away and the moss can be so cleansed that it is fit for use in subsequent filtering operations.

In the form of the filtering apparatus shown in Figs. 4 and 5, the filtering surface is horizontal instead of vertical. On the bottom of an open tank A a coarse wire mesh screen B is laid and covered with a coarse texture cloth C which is kept in position by clamping strips D which are securely held by any convenient device E. By the aid of water a layer of moss of any desired thickness is spread over the cloth C, the surplus being drawn off through the pipes F and outlet G; on the top of the moss is a fine wire sceren H to keep the moss from floating when the sugar liquor is poured into the tank. If desired, there may be placed under the screen H a light open texture cloth I to serve the same purpose as the cloth $v$ in the vertical leaf filter already described. The tank A is supported on suitable bearings J and can be tilted on them to any desired angle; it has a discharge door N, suction outlets L and water inlets M.

When the filter is ready for use the unfiltered sugar liquor as previously described is run into the tank, the vacuum pump is started and the liquor is drawn through the moss by way of the pipes F and N to the vacuum pump or vacuum receiver, as in the case of the vertical leaf filter.

When the rate of filtration becomes too slow owing to accumulation of impurities on the filtering surface, if the cloth I is being used the screen H is raised and the cloth removed and a clean on substituted; the screen is replaced and filtration is proceeded with. If the cloth I is not being used a moderate amount of hot water is poured on to the moss and drawn through it to displace the remaining sweet liquor which it contains; this water is subsequently used in the process of dissolving raw sugar. After this operation, if desired, sugar liquor may be run into the tank and filtration again proceeded with as in the case of the vertical leaf; or the vacuum pump is stopped, the tank is tipped, door N is opened, hot water is admitted through the pipe P and the moss is sluiced out through the door N into any convenient receptacle from which it is pumped to the cleaning tanks as already described.

In the rotary filter shown in Figs. 6-9, the operation of filtration is continuous. A drum 1 which can revolve freely with its axis 2 in bearings 3 is placed in a tank 4. The periphery of the drum is subdivided into any desired number of compartments 5 by the partition strips 6; each compartment is separately connected with the axle 2 by a radial pipe 7, communicating with a separate passage 8 within the axle. On the bottom of each compartment is a coarse wire screen 9 and over that a coarse texture cloth 10 kept in position by the partition strips 6. On the top of the cloth 10 moss is spread by the aid of water until the compartment is completely filled, the excess water overflowing into the tank from which it drains through the outlet 11. As each compartment is filled with moss a fine mesh screen 12 is fastened over it to keep it in position; when all the compartments have in turn been filled and the screens applied, a continuous band of open mesh cloth 13 is extended over the drum and the rollers 14, 15 and 16.

When the filter is ready for operation tank 4 is filled with unfiltered sugar liquor to such a level that the larger portion of the drum is submerged; this level is continually maintained by a regulated flow from the blow-up vats. The drum is revolved very slowly and the vacuum pump connected with pipe 17 is started, whereupon the liquor is drawn through the moss and passes by way of 7, 8 and 17 to the vacuum pump or vacuum receivers.

By the time a compartment has moved from the point where it is submerged in the liquor to the point where it emerges therefrom, the outer band of cloth has become coated with impurities so that the rate of filtration through it is too slow to be practicable; the cloth travels on and leaving the drum at a point 18 passes over the rollers 14, 15 between which hot water is sprayed on to it by the nozzles 19; this washes the impurities into the tank 20 from which they overflow at 21. After passing the roller 15 and emerging from the tank 20 the cleansed cloth passes over roller 16 and returns to the drum at a point 22. Between the points 18 and 22 the cloth does not touch the drum, and air, if not prevented, would therefore be drawn freely through the moss in the exposed compartments and considerably reduce the vacuum, but this is provided against by a valve 23 which automatically and successively cuts off the passages 8 of the exposed compartments from communication with the vacuum pump.

When the filtering capacity of the moss has become exhausted the drum and vacuum pump are stopped, the excess liquor removed from the tank, the continuous band and the screens are removed and the dirty moss is washed from the compartments of the drum into the tank from which it is discharged to the cleaning tank.

Whatever form of filtering apparatus is used, it will be found that the moss performs the same operation of filtering and cleansing the impure sugar solutions (whether cane or beet) as has hitherto been done by Taylor bags or filter presses of well known types. The cloth of coarse mesh used in the filter frame as above described, is not for the purpose of filtering the sugar liquor as other forms of retaining walls may be employed, but when used it will be found that after the dirty moss has been removed from the frame, the cloth will be practically clean and no cleansing of it will be necessary between successive filtering operations.

Having thus described the nature of the said invention and the best means we know of carrying the same into practical effect, we claim:—

1. A process of filtering sugar liquor which consists in passing the liquor through a layer of one or both of the mosses known as sphagnum and leucobryum.

2. A process of filtering sugar liquor which consists in passing the liquor and hot water alternately through a layer of sphagnum or leucobryum, until the rate of filtration is no longer economical.

3. A process of filtering sugar liquor which consists in passing the liquor through a layer of sphagnum or leucobryum, covered with a cloth of open texture, removing the cloth when the rate of filtration has become uneconomical, substituting a washed cloth and continuing the filtration.

4. A material for filtering sugar liquors consisting of dried, disintegrated and cleaned sphagnum or leucobryum or a mixture thereof.

5. A material for filtering sugar liquors consisting of dried, disintegrated sphagnum or leucobryum cleaned by boiling in a solution of alkali and afterward washing with water.

6. A filter for sugar liquors comprising in combination a container having porous walls and a filling of sphagnum or leucobryum.

7. A filter for sugar liquors comprising in combination a container having porous walls including a cloth of a texture adapted to retain coarse and slimy impurities while passing finer substances and a filling of sphagnum or leucobryum.

8. A rotary filter for sugar liquors comprising in combination a filling or sphagnum or leucobryum, a rotating container therefor having porous walls including a cloth of a texture adapted to retain coarse and slimy impurities while passing finer substances, said cloth being arranged as an endless band which leaves and returns to the container, and means for washing the band while it is off the container.

9. A rotary filter for sugar liquors comprising in combination a filling of sphagnum or leucobryum, a rotating container therefor having porous walls including a cloth of a texture adapted to retain coarse and slimy impurities while passing finer substances, said cloth being arranged as an endless band which leaves and returns to the container, means for washing the band while it is off the container, radial pipes in the container conducting to corresponding axial channels in the shaft of same and a valve adapted at each revolution of the container to close those axial channels which correspond with the radial pipes which for the time being are uncovered by the cloth, substantially as and for the purpose specified.

In testimony whereof we have signed our names to this specification in the presence of the subscribing witnesses.

GEORGE WILLIAM SYDNEY SIMPSON.

Witness to the signature of George William Sydney Simpson:
WILLIAM GEORGE STANNARD.

ROBERT F. LYLE.

Witnesses to the signature of Robert Ferris Lyle:
LETITIA FAID,
MARGARET C. ARMSTRONG.